(12) United States Patent
Rohrbeck

(10) Patent No.: US 6,394,136 B1
(45) Date of Patent: May 28, 2002

(54) FLUIDIC CONTROL ELEMENT

(75) Inventor: Heribert Rohrbeck, Schwäbisch Hall (DE)

(73) Assignee: Burkert Werke GmbH & Co., Ingelfingen (DE)

( * ) Notice: Subject to any disclaimer, the term of this patent is extended or adjusted under 35 U.S.C. 154(b) by 0 days.

(21) Appl. No.: 09/623,525

(22) PCT Filed: Feb. 2, 2000

(86) PCT No.: PCT/EP00/00823

§ 371 (c)(1),
(2), (4) Date: Oct. 3, 2000

(87) PCT Pub. No.: WO00/46515

PCT Pub. Date: Aug. 10, 2000

(30) Foreign Application Priority Data

Feb. 3, 1999 (DE) ..................................... 299 01 855 U

(51) Int. Cl.$^7$ ............................................... F16K 11/04
(52) U.S. Cl. ................... 137/625.44; 137/867
(58) Field of Search ............................ 137/625.44, 867

(56) References Cited

U.S. PATENT DOCUMENTS 4,765,370 A 8/1988 Ariizumi et al.
5,027,857 A * 7/1991 Champseix ............ 137/625.44
5,711,346 A 1/1998 Pieloth et al.

FOREIGN PATENT DOCUMENTS

| DE | 39 40 099 | 6/1991 |
| DE | 295 07 380 | 8/1995 |
| EP | 0 277 055 | 1/1991 |
| EP | 0 488 262 | 6/1992 |
| FR | 1 249 404 | 3/1961 |

* cited by examiner

*Primary Examiner*—John Fox
(74) *Attorney, Agent, or Firm*—Nixon Peabody LLP; Stuart J. Friedman

(57) ABSTRACT

A fluid control element comprises a housing, a control chamber (12) which is formed in the housing and into which at least two flow channels (16, 16') open, at least one sealing seat (14, 14') located in the control chamber (12) and associated with the flow channels, and a sealing and actuation element (13) arranged in the control chamber (12) and surrounded by elastic material, which element is pivotally mounted on the housing and can be moved between a closed position, in which it covers a sealing seat (14) with one of its ends as well as an open position, in which it opens the sealing seat (14). The sealing and actuation element (13) forms a two-armed lever (23) whose pivot mount (22) is formed by a covering (18) which is made of elastic material, tightly surrounds the lever (23) and is clamped between two flat parts (10, 11) of the housing (10, 11).

7 Claims, 1 Drawing Sheet

FLUIDIC CONTROL ELEMENT

The invention relates to a fluid control element comprising a housing and a control chamber which is formed in the housing and into which at least two flow channels open. In the control chamber, at least one sealing seat is arranged into which a to flow channel enters. Moreover, in the control chamber, there is a sealing and actuation element that is surrounded by elastic material and that is configured as a lever with two symmetrical arms, which lever is pivotally mounted on the housing and, in the simplest case, can be moved between a closed position, in which it covers a sealing seat with a seat seal located on the end of a lever arm, and an open position, in which it exposes the sealing seat.

Fluid control elements of the type described above are known from DE 295 07 380 U1. With these known fluid control elements, the flow channels and the adjacent valve seats are arranged diametrically in two approximately identical housing parts. The control element consists of a two-armed lever that is supported in the middle of the housing. One of the lever arms is moved between the two seats located opposite each other, while the second lever arm serves as a movement arm. An elastic covering arranged around the actuation element serves as the seal between the housing parts as well as the control chamber and the drive chamber. As a result of the diametrical arrangement of the valve seats, the channels in the fluid control element are at an angle in order to achieve a simple fluid interface in which all of the channels are lead out of the fluid control element in one plane. This leads to an undesired increase of the internal volume and thus of the accommodating housing.

An object of the invention to improve a fluid control element of the type described above in such a way that the fluid interface is arranged horizontally in a plane in a housing part without derivation of the channels. Due to this measure, the internal volume of the fluid control element can be reduced in a simple manner which advantageously results in a smaller housing size. Furthermore, with the fluid control element according to the invention, the number of components is reduced to a few parts, as a consequence of which it can be assembled simply and is better suited for mass production.

The invention provides a fluid control element in which the sealing seats and the adjacent fluid channels are accommodated horizontally in a plane in a housing part. Due to this measure there is made available an interface that allows a standardized coupling of the fluid control element to additional fluid components. In the simplest case, the second housing part serves as a cover. In a preferred embodiment of the fluid control element, the two housing halves are joined along a separating plane and can be manufactured simply as well as inexpensively. According to the invention, a combined sealing and actuation element having an outer part is clamped between the two housing parts, the middle of a pivoting lever rests on the housing on a support arm and, with its seat seals mounted on the side facing the sealing seats, alternatingly opens and closes the sealing seats to the left and right of this support. The sealing and actuation element is completely surrounded by a covering made of an elastic material in which the seat seals are integrated.

The invention is distinguished by the sealing and actuation element in the form of a two-armed lever that is provided with a support arm arranged at a right angle to the lengthwise axis of the lever and whose outer ends  likewise tightly surrounded by the covering  are pivotally mounted by means of this covering that is secured between the two housing parts. This type of support stands out for its great resilience, so that only small drive forces are needed, as well as for a precise definition of the swiveling axis which largely prevents uncontrolled movements of the two-armed lever in spite of its being supported in elastically resilient material.

The two-armed lever is actuated by applying a torque to the support arm whose ends project from the fluid housing. For this purpose, actuation arms follow the support arm and these arms can be controlled in any desired manner, for example, by means of an electromagnet, a piezoelectric element, etc.

In another embodiment, the drive forces and the locking forces needed to pivot the lever are considerably reduced by a fluid feedback. The pressure on the fluid control element in its holding positions is relieved in that, together with the lever, the upper part of the housing forms two pressure chambers that are completely sealed off from the working chamber and from each other by the lever arms. Each of the flow channels associated with a sealing seat communicate with one of the pressure chambers via feedback channels. The lever arm surface that faces the associated pressure chamber is thus subjected to a pressure that endeavors to press the seat seal of this lever arm against the sealing seat located on the side facing away from the pressure chamber. The drive forces to be applied to the actuation arm are correspondingly less.

The fluid control element according to the invention can be used to shut off, carry, throttle, switch over, mix or distribute fluid streams. The flow channels that open into the bottom of the housing preferably form a standardized fluid interface to which the other system elements with appropriate interfaces can be coupled. Depending on the intended use of the fluid control element, the support arm or the actuation arms is/are coupled to different drive units which are likewise standardized and thus interchangeable.

The invention is shown below with reference to an embodiment depicted in the appended drawings in which.

Figure 1:
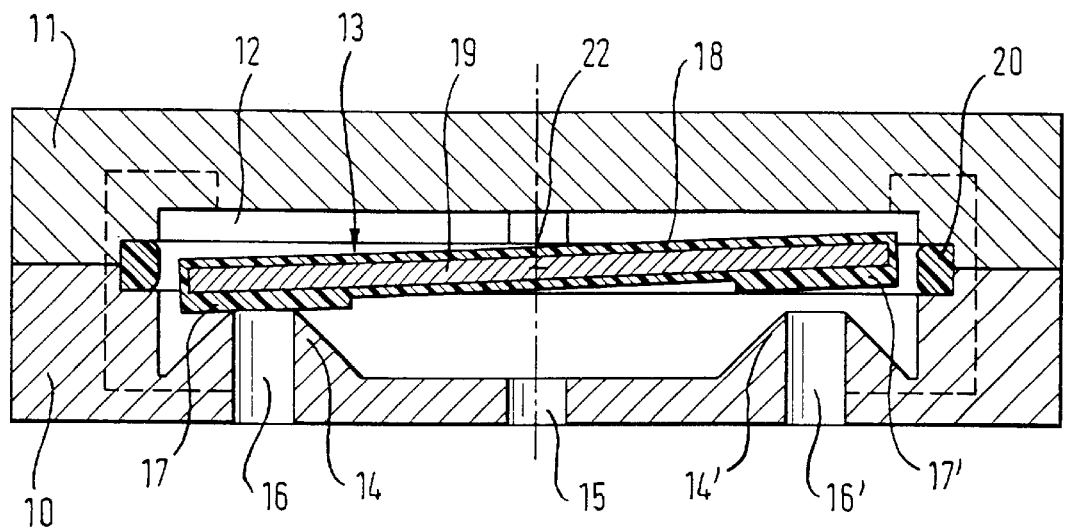
FIG. 1 shows a cross-sectional drawing through a preferred embodiment of a fluid control element according to the invention.

FIG. 1 shows a preferred embodiment of the fluid control element in a 3/2-way function with a generally flat, cuboidal housing that consists of two housing parts 10, 11. A control chamber 12 is formed between the housing parts 10, 11. Two sealing seats 14, 14' that are formed in one plane on the housing part 10 project into the control chamber 12. Extending from each sealing seat 14, 14', there is a flow channel 16, 16' that runs in a straight line and passes through the wall of the housing part 10. Another flow channel 15 leads out of the control chamber 12 through the same wall and, like the flow channels 16, 16', opens into the bottom of the housing 10. The housing part 11 serves as the cover of the control chamber 12. In the control chamber 12, there is a sealing and actuation element 13 that consists of a rigid core 19  surrounded by an elastic material  of a lever 23 that is pivotally mounted between the housing parts 10, 11 and that can be moved between two end positions, the pivot mount 22 of the lever 23 being formed by a covering 18 that tightly surrounds the lever and is clamped between two parts 10, 11 of the housing and that is made of an elastic material. With a seat seal 17 molded on the side of the lever arm 23a that is opposite the sealing seat 14, the lever 23 covers the first sealing seat 14 and, by means of the seat seal 17' molded on it, opens the second sealing seat 14' with the side of the lever arm 23b that is opposite the sealing seat 14'. In a second end position, the lever 23 opens the first sealing seat 14 and closes the second sealing seat 14'.

Figure 2:
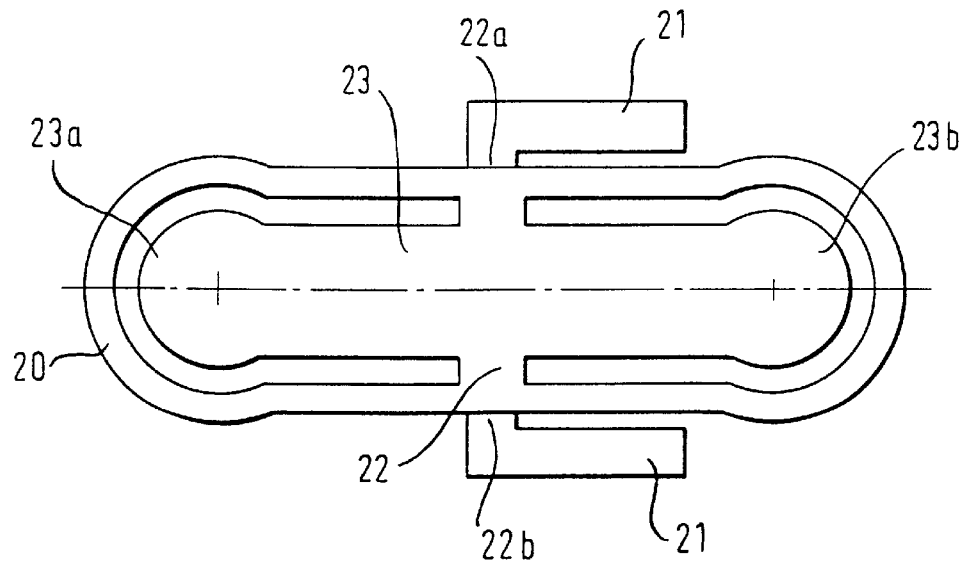
FIG. 2 shows a top view of the combined sealing and actuation element.

A combined sealing and actuation element 13 clamped between the housing parts 10, II is shown separately in FIG. 2. It consists of a lever 23 that is designed with two control arms 23a and 23b, of a support arm 22 whose ends 22a, 22b are followed by the actuation arms 21, and a sealing frame 20 made of elastomeric material and forming a unit together with the covering 18 of the control arms 23a and 23b and of the support arm 22. This combined sealing and actuation element 13 consists of a two-armed lever 23 whose arms 23a, 23b make up the control arms. This lever is pivotally mounted between these arms 23a, 23b on the support arm 22 arranged perpendicular to the lengthwise axis of the two-armed lever 23. The outer ends of the support arms 22 project from the sealing frame 20. The sealing frame 20 surrounds the covering 18 of the control arms 23a and 23b at a distance and, in the installed position, it forms an outer delimitation and a seal of the control chamber 12.

As can be seen in FIG. 1, the support arm 22 is clamped on the outer edge with its covering 18 between the housing parts 10, 11. The covering 18 made of elastomeric material forms a bearing for rotation of the ends of the support arm 22a, 22b and thus a pivot mount for the two-armed lever 23 consisting of the control arms 23a and 23b. Above the sealing seats 14, 14', the sealing and actuation element 13 with its covering 18 can be moved and alternatingly covers these seats or opens them by means of the seat seal 17, 17' formed onto the covering 18. The sealing and actuation element 13 is driven by applying a torque to the support arm 22 whose ends 22a, 22b project from the housing, for example, by moving the actuation brackets 21 that follow the ends of the support arm 22a, 22b.

What is claimed is:

1. A fluid control element comprising a housing having at least two flat parts, a control chamber formed in the housing, two flow channels opening into the control chamber, first and second sealing seats located in the control chamber, each sealing seat being associated with one of the flow channels, and a sealing and actuation element arranged in the control chamber and surrounded by elastic material, the sealing and actuation element having first and second seat seals on its opposed ends and on the side of said element which is opposite to said first and second sealing seats, said element forming a two-armed lever movable between a first position in which said first seat seal closes said first sealing seat while concurrently said second seat seal is moved out of sealing contact with said second sealing seat to open said second sealing seat and a second position in which said second seat seal closes said second sealing seat while concurrently said first seat seal is moved out of sealing contact with said first sealing seat to open said first sealing seat, said lever having a longitudinal axis, the sealing and actuation element being pivotally mounted on the housing by a pivot mount formed by a covering made of elastic material, the covering tightly surrounding the lever and being clamped between said at least two flat parts of the housing, the lever further comprising a support arm arranged substantially perpendicular to the longitudinal axis of the lever, the support arm having outer ends tightly surrounded by the covering and rotatably mounted by means of the covering clamped between said at least two flat parts of the housing, the outer ends of the support arm projecting laterally from the covering and the housing, the support arm further having at least one actuation bracket formed on one of the outer ends.

2. The fluid control element according to claim 1, wherein said fluid control element is configured as a 3/2-way valve wherein a further flow channel is provided as an inlet channel between said sealing seats.

3. The fluid control element according to claims 1 or 2, wherein said lever includes a core and the core of the lever is made of a rigid material.

4. The fluid control element according to claims 1 or 2, wherein the lever arms of the sealing and actuation element are identical actuation arms having sides facing the sealing seats, said sides including seat seals molded thereon.

5. The fluid control element according to claims 1 or 2, wherein the housing consists of at least two flat housing parts joined along a separating plane.

6. The fluid control element according to claim 1 wherein said two sealing seats are arranged in the control chamber in a plane on one of said at least two flat housing parts.

7. The fluid control element according to claims 1 or 2, wherein two flow channels pass perpendicularly through one of said at least two flat housing parts and each open into a sealing seat inside the housing.

* * * * *